United States Patent
Kwok et al.

(10) Patent No.: US 10,153,888 B1
(45) Date of Patent: Dec. 11, 2018

(54) RANK INDICATOR ADAPTATION BASED ON DOWNLINK ERROR RATE

(71) Applicant: T-Mobile USA, Inc., Bellevue, WA (US)

(72) Inventors: Ming Shan Kwok, Seattle, WA (US); Jeff Ahmet, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/686,012

(22) Filed: Aug. 24, 2017

Related U.S. Application Data (60) Provisional application No. 62/507,006, filed on May 16, 2017.

(51) Int. Cl.
| | | |
|---|---|---|
| *H04L 5/00* | (2006.01) |
| *H04W 72/06* | (2009.01) |
| *H04W 72/04* | (2009.01) |
| *H04L 1/18* | (2006.01) |
| *H04W 72/08* | (2009.01) |
| *H04L 1/00* | (2006.01) |
| *H04L 1/20* | (2006.01) |
| *H04B 7/06* | (2006.01) |

(52) U.S. Cl.
CPC .......... *H04L 5/0057* (2013.01); *H04L 1/1812* (2013.01); *H04W 72/0413* (2013.01); *H04W 72/0473* (2013.01); *H04W 72/06* (2013.01); *H04W 72/08* (2013.01); *H04B 7/0632* (2013.01); *H04L 1/0026* (2013.01); *H04L 1/203* (2013.01)

(58) Field of Classification Search
CPC ............... H04L 5/0057; H04L 1/1812; H04W 72/0413; H04W 72/0473; H04W 72/06; H04W 72/08
See application file for complete search history.

(56) References Cited

U.S. PATENT DOCUMENTS

| | | | |
|---|---|---|---|
| 9,369,191 B2 | 6/2016 | Lee et al. | |
| 2007/0005749 A1* | 1/2007 | Sampath | H04B 7/0417 709/223 |
| 2011/0149914 A1* | 6/2011 | Tidestav | H04B 7/0434 370/335 |

(Continued)

FOREIGN PATENT DOCUMENTS

| | | |
|---|---|---|
| KR | 101057613 | 8/2011 |
| WO | WO2011075058 A1 | 6/2011 |

OTHER PUBLICATIONS

The PCT Search Report and Written Opinion dated Sep. 12, 2018, for PCT Application No. PCT/US18/31852, 13 pages.

*Primary Examiner* — Magdi Elhag
(74) *Attorney, Agent, or Firm* — Lee & Hayes, PLLC (57) ABSTRACT

A method of inducing increased throughput to a telecommunication device, in which the telecommunication device sets a rank indicator (RI) based on a number of multiple-input multiple-output (MIMO) data streams received and decoded from a base station, determines an error rate of the decoded MIMO data streams, and increases the RI when it is less than a maximum RI and the error rate is less than an RI increase threshold. The RI is reported from the telecommunication device to the base station, which uses the increased RI to increase the number of MIMO data streams it sends to the telecommunication device.

20 Claims, 3 Drawing Sheets

(56) References Cited

U.S. PATENT DOCUMENTS

| | | | |
|---|---|---|---|
| 2011/0305161 A1* | 12/2011 | Ekpenyong | H04L 1/0031 |
| | | | 370/252 |
| 2012/0003981 A1* | 1/2012 | Krishnamurthy | H04W 24/10 |
| | | | 455/450 |
| 2013/0287139 A1* | 10/2013 | Zhu | H04N 21/2365 |
| | | | 375/295 |
| 2013/0324145 A1* | 12/2013 | Tabet | H04W 72/085 |
| | | | 455/452.2 |
| 2016/0157133 A1 | 6/2016 | Ehsan et al. | |
| 2016/0323027 A1 | 11/2016 | Zhu et al. | |
| 2018/0027527 A1* | 1/2018 | Vitthaladevuni | H04B 7/0413 |

* cited by examiner

RANK INDICATOR ADAPTATION BASED ON DOWNLINK ERROR RATE

RELATED APPLICATIONS

This U.S. patent application claims priority to provisional U.S. Patent Application No. 62/507,006, filed May 16, 2017, the entirety of which is incorporated herein by reference.

BACKGROUND

Wireless communication devices are commonly used to browse the Internet, transmit files, stream music and video, and perform other tasks that involve wirelessly receiving data from a network. The user experience is improved when such data transmissions occur quickly, and thus network operators and device manufacturers strive to improve data throughput.

One technique for improving data throughput between devices uses multiple-input multiple-output (MIMO) technology. In a MIMO configuration, devices can have multiple transmitting antennas and/or multiple receiving antennas, such that multiple data streams can be sent between the multiple antennas over the same radio channel. As each data stream can have substantially the same capacity for transmitting data, increasing the number of data streams can accordingly increase the amount of data that can be transmitted, thereby improving throughput. However, there is a risk that some of the MIMO data streams may not be properly decoded at the receiving device due to interference, noise, or other issues.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

In a radio access network (RAN), a network base station can wirelessly transmit data to a telecommunication device. The data throughput to the telecommunication device can depend, at least in part, on a Modulation and Coding Scheme (MCS) used by the base station, as well as the number of multiple-input multiple-output (MIMO) data streams sent by the base station to the telecommunication device.

An MCS can indicate a particular modulation scheme used by a base station, such as a quadrature amplitude modulation (QAM) scheme that increases throughput by combining multiple modulated signals into a single channel. The amount of the throughput increase can depend on the particular QAM scheme. For example, an MCS that uses 256-QAM can lead to a higher throughput that an MCS that uses 64-QAM, because 256-QAM can carry 8 bits per symbol while 64-QAM can carry 6 bits per symbol.

MIMO techniques can also be used to increase throughput to the telecommunication device when the telecommunication device and base station have multiple transmitting and/or receiving antennas. For example, the base station can transmit multiple MIMO data streams using different antennas, and the telecommunication device can receive the transmitted signals and decode them back into the original data streams. Each MIMO data stream can have substantially the same data capacity, and accordingly increasing the number of MIMO data streams sent by the base station can increase throughput to the telecommunication device.

A base station can combine MIMO techniques and modulation schemes defined by an MCS to adjust the throughput to a telecommunication device. For example, in some situations peak data throughput of over 1 Gigabit per second (Gbps) can be achieved when four data streams can be sent and received in a 4×4 MIMO system using a 256-QAM MCS.

However, sending the maximum number of data streams using the best MCS is not always possible. Due to the multipath propagation of the MIMO data streams, interference, noise, and/or other issues can make it difficult to decode each of the originally sent data streams. Accordingly, the telecommunication device can report information to the base station about the signals it is receiving, such that the base station can adjust how it is sending signals to the telecommunication device based on current radio conditions.

The report sent by the telecommunication device can include a Rank Indicator (RI) and a Channel Quality Indicator (CQI). The RI indicates a MIMO layer associated with a number of MIMO data streams decoded by the telecommunication device. The CQI indicates the quality of signals received by the telecommunication device, in some examples and can be based on an error rate measured by the telecommunication device, such as a downlink Block Error Rate (DL BLER). For example, a telecommunication device can determine the DL BLER of received signals, and report a CQI value to the base station that is associated with an MCS expected to lead to a DL BLER under a predefined acceptable BLER, such as a BLER of 10%. In some examples the telecommunication device's report can include the measured error rate instead of, or in addition to, the CQI.

After receiving reported RI and CQI values from the telecommunication device, the base station can select the number of MIMO data streams to send based on the reported RI and the MCS to use based on the reported CQI. For example, if the telecommunication device reports an RI value of "3" and a particular CQI value, the base station can follow that information to transmit three MIMO data streams using an MCS associated with the reported CQI value.

However, test results have shown that telecommunications devices prioritize sending a CQI value linked to a higher MCS over sending a higher RI value. For example, in tests in which the maximum RI value was four and an acceptable error rate threshold was set at a DL BLER of 10%, when telecommunication devices measured a DL BLER of only 2% or another percentage well below the 10% acceptable BLER threshold, they often reported a high CQI but a lower than maximum RI value of "3." The difference between the measured error rates and the acceptable error rate threshold in these tests indicates that, as will be discussed below, in some cases the telecommunication device can handle one or more additional MIMO data streams without the measured error rate going over the acceptable error rate threshold. Sending additional MIMO data streams when such capacity exists would lead to increased throughput to the telecommunication device.

This disclosure describes various systems and processes that can be implemented at telecommunication device to adaptively induce a base station to send one or more additional MIMO data streams in certain situations, in order to increase the data throughput to the telecommunication device. As described herein, when the telecommunication device measures an RI value that is less than a maximum RI, but it measures an error rate below an acceptable error rate threshold, it can report an inflated RI value to the base station that is higher than the measured RI value. The base station can then follow the reported inflated RI value to send an increased number of MIMO data streams to the telecommunication device.

Example Environment

Figure 1:
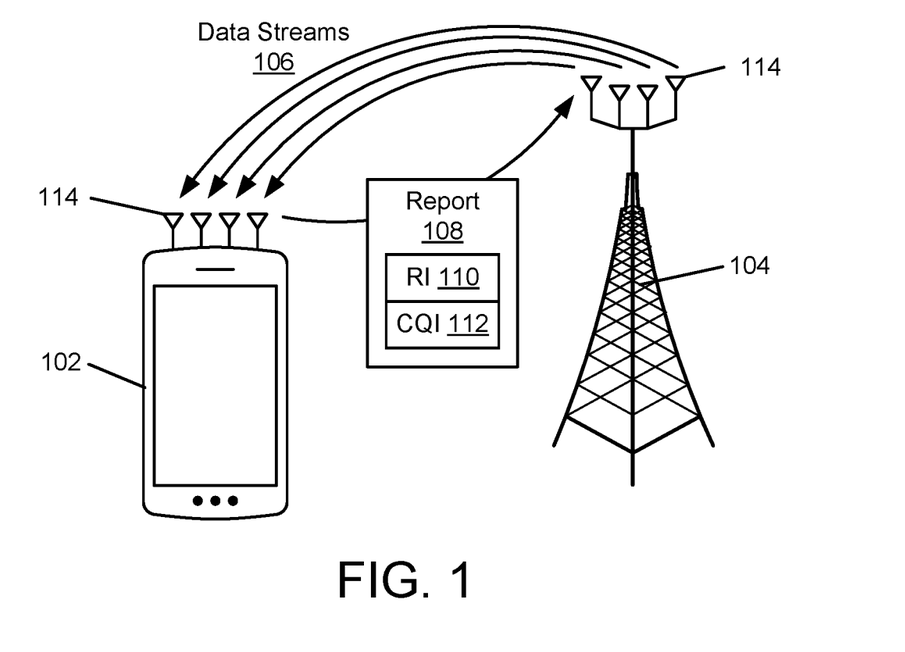
FIG. 1 depicts a telecommunication device in wireless communication with a network base station via multiple data streams using multiple-input multiple-output (MIMO) techniques.

FIG. 1 depicts a telecommunication device 102 in wireless communication with a network base station 104 via multiple data streams 106 using multiple-input multiple-output (MIMO) techniques. As will be described below, the base station 104 can determine the number of data streams 106 to transmit to the telecommunication device 102 based on a report 108 sent from the telecommunication device 102 to the base station 104 about previous transmissions it has received from the base station 104. The report 108 can include a Rank Indicator (RI) 110 and/or a Channel Quality Indicator (CQI) 112.

A telecommunication device 102 can be any device that wirelessly connects to a base station 104, such as a smart phone, a cellular phone, a personal digital assistant (PDA), a personal computer (PC), a laptop, a desktop, a workstation, a media player, a tablet, an electronic book device, a gaming device, a television, a media center, a smart watch, or any other type of computing or communication device. An example telecommunication device 102 is illustrated in greater detail in FIG. 3 and is described in detail below with reference to that figure.

A base station 104 can be a node or other access point that provides a connected telecommunication device 102 with access to a telecommunications network through a wireless access technology, such as Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and/or WiFi® technology. For example, in an LTE network a base station 104 can be an eNode B.

A telecommunication device 102 and base station 104 can each have multiple antennas 114 for transmitting and/or receiving data, such that they can use MIMO techniques to send and/or receive different data streams 106 with different antennas 114. In general, the arrangement of transmitter antennas 114 and receiver antennas 114 in a MIMO system can be expressed as NxM, with N indicating the number of transmitter antennas 114 and M indicating the number of receiver antennas 114. For example, devices in a 2×2 MIMO system can have two transmitter antennas 114 and two receiver antennas 114, while devices in a 4×4 MIMO system can have four transmitter antennas 114 and four receiver antennas 114. While in some examples N can be equal to M, in other examples N and M can be different.

Using MIMO, the base station 104 can split data to be transmitted to the telecommunication device 102 into multiple data streams 106 using multiplexing, such as open-loop or closed-loop spatial multiplexing. The base station 104 can transmit each of the multiple data streams 106 with a different transmitting antenna 114 over the same radio channel. The signals transmitted from each transmitting antenna 114 can take different paths to the telecommunication device 102. Accordingly, parts of some or all of the different signals from the different transmitting antennas 114 can be received at multiple receiving antennas 114 at the telecommunication device 102. The telecommunication device 102 can decode the received signals and reconstruct the original data streams 106.

Each data stream 106 can have substantially the same data capacity. Accordingly, each additional data stream 106 that can be transmitted from the base station 104 and be received and decoded by the telecommunication device 102 using MIMO techniques can correspondingly increase the data throughput to the telecommunication device 102.

The base station 104 can also transmit the data streams 106 to the telecommunication device 102 using a Modulation and Coding Scheme (MCS). An MCS can define a modulation scheme, code rate, and/or other attributes that the base station 104 can use when sending data transmissions to the telecommunication device 102, such as a quadrature amplitude modulation (QAM) scheme that can increase throughput by combining multiple modulated signals into a single channel. For example, an MCS can identify a particular modulation scheme, such as 256-QAM, 64-QAM, 16-QAM, or any other modulation scheme. The number prefacing "QAM" in these schemes can indicate the number of bits that can be carried per symbol in that scheme. For instance, 256-QAM can carry 8 bits per symbol, while 64-QAM can carry 6 bits per symbol.

As mentioned above, the telecommunication device 102 can send back a report 108 to the base station 104 about how the data streams 106 are being received, including RI 110 and/or CQI 112 values. In various examples, the telecommunication device 102 can send a report 108 periodically at regular intervals, at irregular intervals or predefined times, upon request by the base station 104, or upon the occurrence of a reporting event.

The RI 110 in the report 108 can indicate a number of data streams 106 that the telecommunication device 102 is requesting from the base station 104. The telecommunication device 102 can determine the value of the RI 110 based at least in part on the number of data streams 106 it decoded within signals received from the base station 104. Selection of the RI 110 value will be discussed in more detail below.

The reported RI 110 can be less than or equal to a maximum RI associated with the MIMO configurations of the telecommunication device 102 and the base station 104. The maximum RI can be the maximum number of MIMO data streams 106 that could be transmitted from the base station 104 to the receiver antennas 114 of the telecommunication device 102, as limited by the number of transmitter antennas 114 in the base station 104 and the number of receiver antennas 114 in the telecommunication device 102. As such, when the base station 104 has X transmitter antennas 114 and the telecommunication device 102 has Y receiver antennas 114, the maximum RI can be at most the lower of X and Y.

For example, if the telecommunication device 102 has four receiver antennas 114 and a base station 104 is capable of sending four data streams 106 to those four receiving antennas 114 in a 4×4 MIMO configuration, the maximum RI can be set to four. In other examples the maximum RI can be set to a higher or lower value determined by the number of receiver antennas 114 in the telecommunication device 102 and/or a maximum number of data streams 106 a base station 104 can send to those receiving antennas 114 using MIMO techniques. For instance, in an 8×8 MIMO configuration, the maximum RI can be set to eight.

Figure 2:
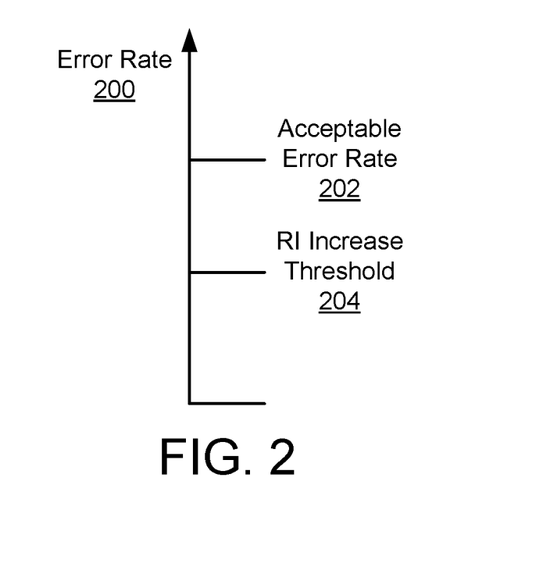
FIG. 2 depicts a graph in which a measured error rate can be compared to a predefined acceptable error rate and/or an RI increase threshold.

The CQI 112 in the report 108 can be based on an error rate 200 measured by the telecommunication device. FIG. 2 depicts a graph in which a measured error rate 200 can be compared to a predefined acceptable error rate 202 and/or an RI increase threshold 204 as will be discussed further below. In some examples the telecommunication device 102 can include the measured error rate 200 in the report 108 in addition to, or in place of, the CQI 112.

In some examples an error rate 200 can be a downlink Block Error Rate (DL BLER) determined by the telecommunication device. The telecommunication device 102 can use an error detection technique, such as analyzing a cyclic redundancy check (CRC) code in a received data block, to determine when a received data block contains an error. The DL BLER can be the percentage of the total number of data blocks that are found to have an error. The telecommunication device 102 can thus determine the DL BLER of received signals, and include a CQI 112 in the report 108 that is associated with an MCS expected to lead to a DL BLER under a predefined acceptable error rate 202, such as a DL BLER of 10%. In other examples the error rate 200 can be measured as a bit error rate (BER), signal to noise ratio (SNR), or any other measure of errors within received data.

When the base station 104 receives a report 108 including an RI 110 and a CQI 112 values from the telecommunication device 102, it can use those reported values to adjust or select the number of data streams 106 to send to the telecommunication device 102 using MIMO, and/or the MCS to use when sending those data streams 106. For example, when the reported RI 110 is "3" and the reported CQI 112 is associated with an MCS, the base station 104 can send the telecommunication device 102 three MIMO data streams 106 using that MCS. While the base station 104 may choose to adjust the MCS, it does not attempt to override the reported RI 110.

As will be discussed below, in some situations the telecommunication device 102 can change the data in the report 108 from what it would otherwise include, in order to adaptively induce the base station 104 to increase the number of data streams 106 it sends to the telecommunication device 102 using MIMO. By inducing the base station 104 to transmit an increased number of data streams 106 in these situations, data throughput to the telecommunication device 102 can be increased.

Example Architecture

Figure 3:
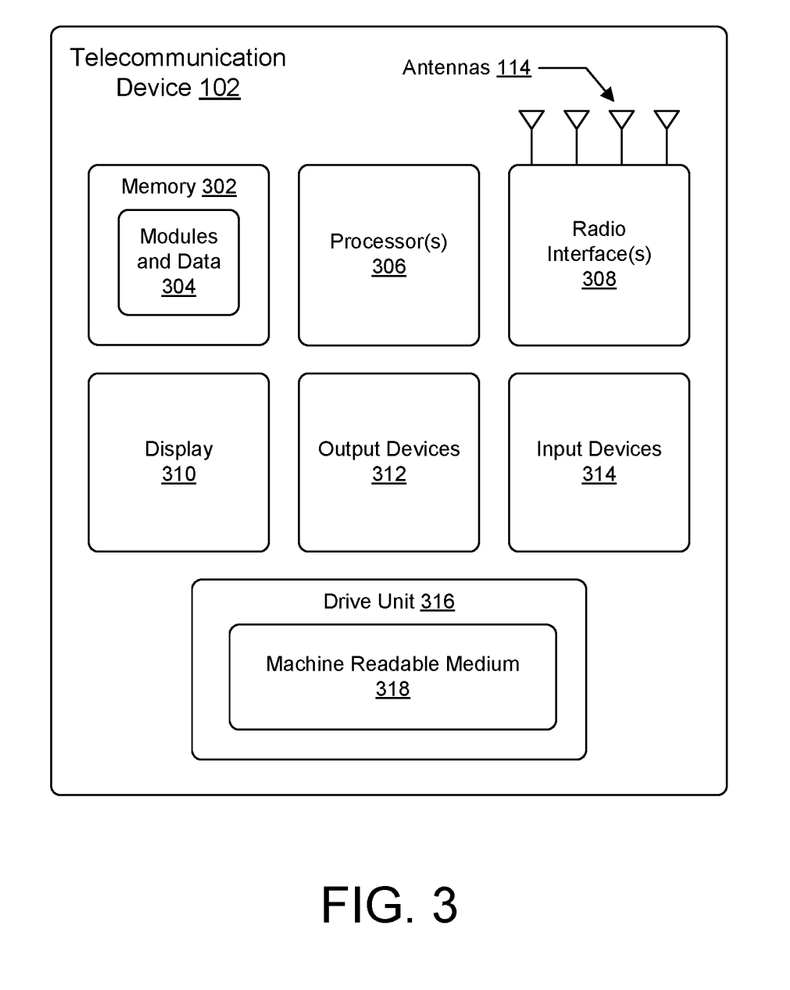
FIG. 3 depicts an example system architecture for a telecommunication device.

FIG. 3 depicts an example system architecture for a telecommunication device 102, in accordance with various examples. As shown, in addition to the antennas 114 discussed above, a telecommunication device 102 can also include a memory 302 that stores modules and data 304, processor(s) 306, radio interfaces 308, a display 310, output devices 312, input devices 314, and/or a drive unit 316 including a machine readable medium 318.

In various examples, memory 302 generally includes both volatile memory and non-volatile memory, such as RAM, ROM, EEPROM, Flash Memory, a hard drive, a memory card, optical storage, magnetic cassettes, magnetic tape, magnetic disk storage or other magnetic storage devices, or any other medium. In some examples memory 302 can also include a SIM (subscriber identity module) card, which is a removable memory card used to identify a user of the telecommunication device 102 to a telecommunication network. Memory 302 can also be described as computer storage media and may include volatile and nonvolatile, removable and non-removable media implemented in any method or technology for storage of information, such as computer readable instructions, data structures, program modules, or other data.

The modules and data 304 can be utilized by the telecommunication device 102 to perform or enable performing any action taken by the telecommunication device 102. The modules and data 304 can include a telecommunication device platform and applications, and data utilized by the platform and applications.

In some examples, the processor(s) 306 is a central processing unit (CPU), a graphics processing unit (GPU), or both CPU and GPU, or any other sort of processing unit.

The radio interfaces 308 can include transceivers, modems, interfaces, and/or other components that perform or assist in exchanging radio frequency (RF) communications with a base station 104 via transmitter and receiver antennas 114. By way of a non-limiting example, a telecommunication device's radio interfaces 308 can include an RF Front End (RFFE) that receives RF signals via four receiving antennas 114 in a 4×4 MIMO configuration, an RFIC (RF Integrated Chip) that decodes the RF signals into four data streams 106, and a modem that performs other processing operations on the data streams 106. In other examples a processor 306, other modules and data 304, and/or other components of the telecommunication device 102 can perform or assist in transmitting and/or receiving data via the antennas 114, and/or pre-processing or post-processing of such data.

In various examples, the display 310 is a liquid crystal display or any other type of display commonly used in telecommunication devices 102. For example, display 310 may be a touch-sensitive display screen, and can then also act as an input device or keypad, such as for providing a soft-key keyboard, navigation buttons, or any other type of input.

In some examples, the output devices 312 can include any sort of output devices known in the art, such as a display 310, speakers, a vibrating mechanism, and/or a tactile feedback mechanism. Output devices 312 can also include ports for one or more peripheral devices, such as headphones, peripheral speakers, and/or a peripheral display.

In various embodiments, input devices 314 can include any sort of input devices known in the art. For example, input devices 314 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 318 can store one or more sets of instructions, such as software or firmware, that embodies any one or more of the methodologies or functions described herein. The instructions can also reside, completely or at least partially, within the memory 302, processor(s) 306, and/or radio interface(s) 308 during execution thereof by the telecommunication device 102. The memory 302 and the processor(s) 306 also can constitute machine readable media 322.

Example Operations

Figure 4:
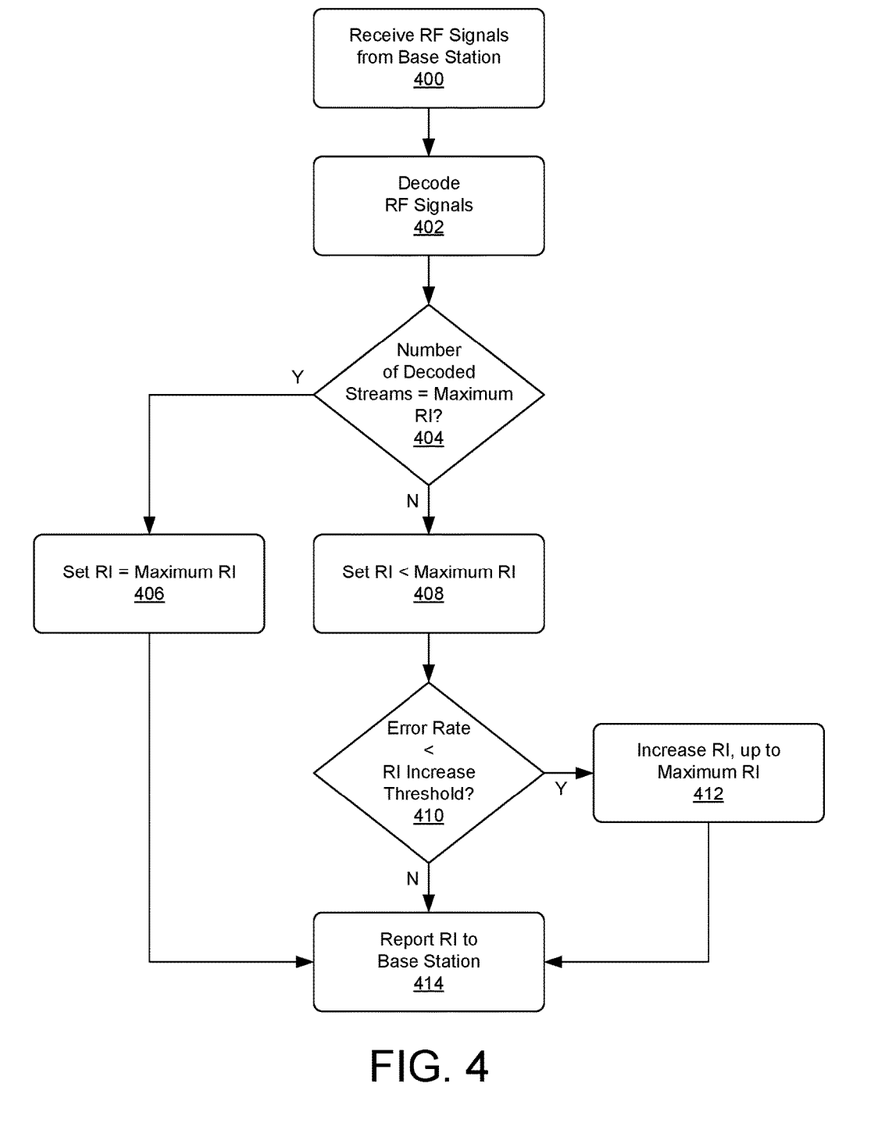
FIG. 4 depicts a flow chart of a method for increasing throughput to a telecommunication device by inducing a base station to transmit additional data streams using MIMO techniques.

FIG. 4 depicts a flow chart of a method for increasing throughput to a telecommunication device by inducing a base station 104 to transmit additional data streams 106 using MIMO techniques.

At block 400, the telecommunication device 102 can receive RF signals from the base station 104 using multiple receiver antennas 114.

At block 402, the telecommunication device 102 can decode the received RF signals into one or more data streams 106. For example, the telecommunication device 102 can de-multiplex the received RF signals to distinguish different data streams 106 sent over the same radio channel. In some cases the telecommunication device 102 may not be able to successfully decode all of the data streams 106 sent by the base station 104, such as when there is noise or interference due to multipath propagation of the MIMO signals, or other issues that affect the signals received by the telecommunication device. During or following decoding, the telecommunication device 102 can also determine an error rate 200 of the decoded data. For example, the error rate 200 can be measured as a downlink Block Error Rate (DL BLER), the percentage of the total number of data blocks that CRC codes indicate have an error.

At block 404, the telecommunication device 102 can count the number of data streams 106 that were decoded during block 402. The telecommunication device 102 can then determine whether the number of different data streams 106 decoded from the received RF signals is equal to a maximum RI for the MIMO arrangement of the telecommunication device 102 and base station 104. As discussed above, the maximum RI can be the maximum number of data streams 106 that could be transmitted from the base station 104 to the telecommunication device 102, as limited by the number of transmitter antennas 114 in the base station 104 and/or the number of receiver antennas 114 in the telecommunication device 102.

For example, if the telecommunication device 102 has four receiver antennas 114 and a base station 104 is capable of sending four data streams 106 to those four receiver antennas 114 in a 4×4 MIMO configuration, the maximum RI can be set to four and the telecommunication device 102 can determine at block 404 whether or not it decoded four data streams 106 from the received RF signals. In other examples the maximum RI can be set to any other value limited by the number of antennas 114 at the telecommunication device 102 and/or base station 104, and the telecommunication device 102 can check at block 404 if it decoded a number of data streams 106 equal to that maximum RI.

If the telecommunication device 102 determines at block 404 that it decoded a number of data streams 106 equal to the maximum RI, it can set the value of an RI 110 to the maximum RI at block 406. For example, if the maximum RI is four and the telecommunication device 102 decoded four data streams 106, it can set the RI to "4." The RI 110 can be reported to the base station 104 at block 414, as will be discussed below.

However, if the telecommunication device 102 determines that it decoded a number of data streams 106 that is less than the maximum RI, at block 408 it can set the value of the RI 110 to the number of decoded data streams 106 and then move to block 410. For example, if the maximum RI is four, but the telecommunication device 102 decoded only three data streams, it can set the RI 110 to "3."

If the telecommunication device 102 did not set the RI 110 to the maximum RI, at block 410 the telecommunication device 102 can determine if the error rate 200 of the decoded data is below an RI increase threshold 204. As shown in FIG. 2, the RI increase threshold 204 can be less than or equal to the acceptable error rate 202. For example, when the acceptable error rate 202 is set to a DL BLER of 10%, the RI increase threshold 204 can be set to a DL BLER of 10%, or to any lower percentage, such as 8%.

If the error rate 200 of the decoded data is found during block 410 to be above the RI increase threshold 204, the telecommunication device 102 can maintain the value of the RI 110 set during block 408 and move to block 414 to report the RI 110 to the base station 104. For example, if the acceptable error rate 202 is a BLER of 10% and the RI increase threshold 204 is set to a BLER of 6%, when the error rate 200 is found to be a BLER of 9% the original RI 110 value can be maintained even though the error rate 200 is below the acceptable error rate 202.

However, if the error rate 200 of the decoded data is found during block 410 to be at or below the RI increase threshold 204, the telecommunication device 102 can increase the value of the RI 110 from the value set during block 408. The RI 110 can be increased by any desired amount, up to the maximum RI. For example, if the maximum RI is four but the RI 110 was set to "3" during block 408 because only three data streams were decoded, when the error rate 200 is below the RI increase threshold 204 the RI 110 can be increased to "4" at block 412. The telecommunication device 102 can then report this increased RI 110 to the base station 104 at block 414.

At block 414, the telecommunication device 102 can send a report 108 to the base station 104 that includes the RI 110 set using the process of FIG. 4. In some examples the telecommunication device 102 can also include a CQI 112 in the report 108. As described above, the telecommunication device 102 can use the measured error rate 200 to also determine the CQI 112. For example, the telecommunication device 102 can determine the DL BLER in received data and then report a CQI 112 value associated with an MCS that is expected to lead to a DL BLER under a predefined acceptable error rate 202, such as a BLER of 10%. In some examples the report 108 can include the measured error rate 200 in place of, or in addition to, the CQI 112.

After the base station 104 receives the report 108, the base station 104 can use the reported RI 110 to determine the number of data streams 106 to transmit to the telecommunication device 102 using MIMO techniques during future transmissions. The base station 104 can also use the reported CQI 112 and/or error rate 200 to determine an MCS to use when sending data during future transmissions.

In situations in which the telecommunication device inflated the reported RI 110 beyond what it otherwise would have reported, because the error rate 200 was found during block 410 to be lower than an RI increase threshold 204, the base station 104 can follow the reported RI 110 and next attempt to send a corresponding number of data streams using MIMO techniques. The telecommunication device 102 can thus adaptively induce the base station 104 to send a higher number of data streams 106 than would otherwise be sent, thereby increasing the data throughput to the telecommunication device 102.

For example, when the base station 104 had been sending three data streams 106 but the telecommunication device 102 sends an RI 110 of "4" because the error rate 200 was found to be lower than the RI increase threshold 204 during block 410, the reported RI 110 can trigger the base station 104 to begin sending in 4×4 MIMO mode, thereby increasing throughput to the telecommunication device 102.

Because the error rate 200 would also be lower than the acceptable error rate 202 in this example, the telecommunication device 110 can also report a high CQI 112 associated with a good MCS that can also increase throughput to the telecommunication device 102. For example, when the reported RI 110 is "4" and the reported CQI 112 is high and associated with an MCS that uses 256-QAM, the report 108 can induce the base station 104 to begin sending in 4×4 MIMO mode using 256-QAM, both of which can increase throughput to the telecommunication device 102.

Inducing the base station 104 to send additional data streams 106 may result in an increase in the measured error rate 200. However, in many situations the additional data stream 106 can be received and decoded by the telecommunication device 102 without the error rate 200 going over the acceptable error rate 202. For example, when the measured error rate 200 is a DL BLER of 2% and the acceptable error rate 202 is a DL BLER of 10%, increasing the RI 110 to induce the base station 104 to send an additional data stream 106 might result in the error rate 200 increasing to a DL BLER of 8% or other percentage that is still below the acceptable error rate 202.

Following sending a report 108 with an increased RI 110, the telecommunication device 102 can monitor the error rate 200, and then drop the RI 110 back to non-increased levels if the error rate 200 goes over the acceptable error rate 202. For example, following sending a report 108 with an increased RI 110 at block 414, the telecommunication device 102 can return to block 400. If the telecommunication device 102 cannot decode a number of data streams 106 equal to the increased RI 110 at block 404, the RI 110 can be set to the number of decodable data streams 106 at block 408. Because the error rate 200 exceeded the RI increase threshold 204 in this example, the telecommunication device 102 would not move to block 412 to increase the RI 110 again, and the lower RI 110 would be reported at block 414.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method of inducing increased throughput to a telecommunication device, comprising:
receiving and decoding, by the telecommunication device, one or more multiple-input multiple-output (MIMO) data streams from a base station via a plurality of receiver antennas of the telecommunication device;
setting, by the telecommunication device, a rank indicator (RI) to the number of decoded MIMO data streams;
determining, by the telecommunication device, an error rate of the decoded MIMO data streams;
increasing, by the telecommunication device, the RI when the RI is less than a maximum RI and the error rate is less than an RI increase threshold, wherein the RI is increased to a value less than or equal to the maximum RI; and
sending, by the telecommunication device, a report including the RI from the telecommunication device to the base station, such that the base station uses the RI to increase the number of MIMO data streams it sends to the telecommunication device.

2. The method of claim 1, wherein the maximum RI is the lowest number between the number of receiver antennas at the telecommunication device and the number of transmitter antennas at the base station.

3. The method of claim 2, wherein in a 4×4 MIMO configuration the number of receiver antennas at the telecommunication device is four, the number of transmitter antennas at the base station is four, and the maximum RI is four.

4. The method of claim 1, wherein the error rate is a downlink block error rate (DL BLER).

5. The method of claim 1, further comprising:
determining a Channel Quality Indicator (CQI) by the telecommunication device based on the error rate; and
including, by the telecommunication device, the CQI in the report.

6. The method of claim 5, wherein the CQI is determined by the telecommunication device by identifying a modulation and coding scheme (MCS) associated with the CQI that is expected to lead to the error rate staying below a predefined acceptable error rate when the MIMO data signals are sent by the base station using the MCS.

7. The method of claim 1, further comprising:
monitoring, by the telecommunication device, the error rate of subsequent MIMO data streams received from the base station following sending the report; and
reducing, by the telecommunication device, the RI from the increased level in a subsequent report sent to the base station when the error rate goes above a predefined acceptable error rate.

8. A telecommunication device, comprising:
a plurality of receiving antennas configured to receive multiple-input multiple-output (MIMO) data streams from a base station;
at least one transmitter antenna;
a radio interface configured to decode the MIMO data streams; and
one or more processors configured to:
set a rank indicator (RI) to the number of decoded MIMO data streams;
determine an error rate of the decoded MIMO data streams;
increasing the RI device when the RI is less than a maximum RI and the error rate is less than an RI increase threshold, wherein the RI is increased to a value less than or equal to the maximum RI; and
send a report including the RI via the at least one transmitter antenna to the base station, such that the base station is induced to use the RI to increase the number of MIMO data streams it sends to the plurality of receiving antennas.

9. The telecommunication device of claim 8, wherein the maximum RI is the lowest number between the number of the plurality of receiver antennas and a number of transmitter antennas at the base station.

10. The telecommunication device of claim 8, wherein in a 4×4 MIMO configuration the number of the plurality of receiver antennas is four, the number of transmitter antennas at the base station is four, and the maximum RI is four.

11. The telecommunication device of claim 8, wherein the error rate is a downlink block error rate (DL BLER).

12. The telecommunication device of claim 8, wherein the one or more processors are further configured to:
determine a Channel Quality Indicator (CQI) based on the error rate; and
include the CQI in the report.

13. The telecommunication device of claim 12, wherein the CQI is determined by identifying a modulation and coding scheme (MCS) associated with the CQI that is expected to lead to the error rate staying below a predefined acceptable error rate when the MIMO data streams are sent by the base station using the MCS.

14. The telecommunication device of claim 8, wherein the one or more processors are further configured to:
   monitor the error rate of subsequent MIMO data streams received from the base station following sending the report; and
   reduce the RI from the increased level in a subsequent report sent to the base station when the error rate goes above a predefined acceptable error rate.

15. One or more non-transitory computer-readable media storing computer-executable instructions that, when executed by a telecommunication device, cause the telecommunication device to perform operations comprising:
   setting a rank indicator (RI) to a number of multiple-input multiple-output (MIMO) data streams that were received from a base station and decoded at the telecommunication device via a plurality of receiver antennas;
   determining an error rate of the decoded MIMO data streams;
   increasing the RI when the RI is less than a maximum RI and the error rate is less than an RI increase threshold, wherein the RI is increased to a value less than or equal to the maximum RI; and
   sending a report including the RI to the base station, such that the base station is induced to use the RI to increase the number of MIMO data streams it sends to the telecommunication device.

16. The one or more non-transitory computer-readable media of claim 15, wherein the maximum RI is the lowest number between the number of receiver antennas at the telecommunication device and the number of transmitter antennas at the base station.

17. The one or more non-transitory computer-readable media of claim 15, wherein in a 4×4 MIMO configuration the number of receiver antennas at the telecommunication device is four, the number of transmitter antennas at the base station is four, and the maximum RI is four.

18. The one or more non-transitory computer-readable media of claim 15, wherein the error rate is a downlink block error rate (DL BLER).

19. The one or more non-transitory computer-readable media of claim 15, wherein the operations further comprise:
   determining a Channel Quality Indicator (CQI) based on the error rate; and
   including the CQI in the report.

20. The one or more non-transitory computer-readable media of claim 15, wherein the CQI is determined by identifying a modulation and coding scheme (MCS) associated with the CQI that is expected to lead to the error rate staying below a predefined acceptable error rate when the MIMO data signals are sent by the base station using the MCS.

* * * * *